United States Patent [19]
Bauer et al.

[11] Patent Number: 5,991,024
[45] Date of Patent: Nov. 23, 1999

[54] CAPILLARY SPECTROMETER

[76] Inventors: Bruno S. Bauer; Victor Kantsyrev, both of Department of Physics, Mail Stop 220, University of Nevada, Reno, Nev. 89557-0058

[21] Appl. No.: 09/087,395

[22] Filed: May 29, 1998

Related U.S. Application Data

[60] Provisional application No. 60/048,050, May 30, 1997.

[51] Int. Cl.⁶ ........................................................ G01D 3/28
[52] U.S. Cl. .......................... 356/326; 356/300; 356/303
[58] Field of Search .................................... 356/326, 300, 356/303

[56] References Cited

U.S. PATENT DOCUMENTS

| | | | |
|---|---|---|---|
| 4,146,332 | 3/1979 | Moore | 356/308 |
| 4,304,491 | 12/1981 | Kraushaar et al. | 356/326 |
| 5,144,374 | 9/1992 | Grego | 356/326 |
| 5,175,755 | 12/1992 | Kumakhov | |
| 5,192,869 | 3/1993 | Kumakhov | |
| 5,231,461 | 7/1993 | Silvergate et al. | 356/326 |
| 5,786,888 | 7/1998 | Allen et al. | 356/73 |

OTHER PUBLICATIONS

Kantsyrev, V., Bruch, R., "New Optical Methods for Short Wavelength Hot Plasma Disgnostics,"Review of Scientific Instruments, vol. 68, (No. 1).

Anan'in et al., "Small Plasma Source With a Capillary Concentrator of Soft X–Rays," Sov. Tech. Phys. Lett., vol. 18, (No. 5).

Kantsyrev, V., "Glass Multicapillary Optics: Creation and Development (excluding microchannel arrays)," 1st International "Developers workshop on Glass Capillary Optics for X–Ray Microbeam Applications".

Kantsyrev, V. L., "Method of Micro X–Ray Graphy With the Use of Laser Plasma Source of Soft X–Rays in Medecine and Biology".

Bykovsky, Yu. A., "The Study and Practical Applications of Laser–Plasma Source of Soft X–Ray," 14 International Congress of High Speed Photography and Photonics.

Basov, N.G., "Plasma Sources of Soft X–Ray Radiation," Phys. Chem. Mech. Surfaces, vol. 4 (No. 9), pp. 2581–2600.

Dense Z–Pinches, "AIP Conference Proceedings 299," 1993.

Kantsyrev et al., "Investigating the Characteristics of X Radiation from a Hot Plasma By Means of Glass Capillary Converters" Quantum Electron, vol. 23, (No. 12).

Kantsyrev, A.L., "The source of X–Ray" U.S.S.R. Invention Certificate N 520863, Oct. 15, 1976.

Bruch et al., "New Concenpts for X–Ray, Soft X–Ray, and Euv Optical Instrumentation Including Applications in Spectroscopy, Plasma Diagnostics, and Biomedical Microscopy: A Status Report". Journal of X–Ray Science and Technology, pp. 139–158.

*Primary Examiner*—Frank G. Font
*Assistant Examiner*—Reginald A. Ratliff

[57] ABSTRACT

A capillary spectrometer is disclosed for observing radiation from a source. The spectrometer comprises a capillary array, a dispersive element, and a short wavelength imaging detector. The capillary guide comprises a receiving end and an emitting end. The receiving end is positioned so that it may receive radiation from the source. As radiation travels through the capillary guide, the course of the radiation is changed so that it is emitted in a predetermined path or paths from the emitting end. The emitted radiation falls on the dispersing element which disperses the radiation into a predetermined pattern. The radiation then falls on sensors of the short wavelength imaging detector which generate electrical signals in response to the frequency and intensity of radiation. Insulators may be used to prevent discrete rays of radiation from interfering with each other as they pass from the capillary guide to the short wavelength imaging detector. The short wavelength imaging detector may be adapted to gather data for specific periods of time during an emitting event so that changes in the radiation may be observed over time. The present invention is particularly well adapted to observe short wavelength light in the extreme ultraviolet, soft x-ray, and regular x-ray regions.

24 Claims, 4 Drawing Sheets

CAPILLARY SPECTROMETER

CROSS REFERENCES TO RELATED APPLICATIONS

This application claims priority of U.S. provisional patent application No. 60/048,050 filed on May 30, 1997.

BACKGROUND OF THE INVENTION

1. Field of Invention

The present invention relates to spectrometer for analyzing radiation. More particularly, the present invention relates to a spectrometer that utilizes a capillary array and a dispersive element to generate two-dimensional spectral images of radiation sources.

2. Description of Related Art

In the fields of fusion research, pulsed power physics, and hot, dense plasma physics, it is important to observe and measure emitted radiation. Observations of emitted radiation are a highly useful means by which data may be obtained in these fields. For example, in hot, current carrying plasma devices, such as Z-pinch devices, measurements of emitted radiation can help determine which plasma configurations result in optimum plasma and energy confinement and which configurations will result in the greatest intensity, hardness, stability, and reproducibility of x-ray emissions.

Measurement of short wavelength radiation, such as extreme ultraviolet (EUV), soft x-rays (SXR), and x-rays, is the dominant means for investigating hot, dense plasmas because this is the most feasible way of observing the plasma and because x-ray emissions are closely correlated with plasma dynamics. Short wavelength spectroscopy can be used to accurately measure plasma density, temperature, flow, charge states, atomic processes, and magnetic fields.

There is a strong need for improved spectroscopic measurements to further the understanding of hot, dense plasmas. The prior art has failed to provide a suitable means for generating two-dimensional images of emitted radiation. Two-dimensional images aid the understanding of the spatial distribution of energy in a plasma and help determine consistency between pulses. The prior art has failed to provide a means for simultaneously observing a broad spectrum of short wavelength radiation. Measurements of a broad range can be used to accurately determine electron energy distribution and to simultaneously observe a variety of atomic processes. The prior art has also failed to provide a means for observing emitted radiation at specific times or intervals during an event. Observations taken at specific times are useful in determining the stability of a plasma and understanding the changes of a plasma over a period of time.

The most widely used prior art spectroscopic method utilizes polychromatic and monochromatic imaging. Monochromatic images taken on one or several spectral lines are used to compile two-dimensional maps of relevant plasma parameters (electron density and electron temperature). A spatial resolution of better than 10 $\mu$m can be achieved. This resolution, however, is restricted to object fields of limited size. For extended sources, such as a z-pinch apparatus, the average distortion of an image generally increases up to 100 $\mu$m or more for plasma columns between 20 and 50 mm in length.

To understand a plasma configuration so that it may be controlled efficiently, it is important to obtain a high-resolution x-ray and EUV imaging. The present invention, described here as a multi-band two-dimensional imaging spectrometer with time framing for rapidly evolving, spatially distributed EUV and x-ray sources, particularly z-pinch type, must meet several constraints.

An essential requirement is a spatial resolution $\Delta r \leq 50-100$ $\mu$m in any point of a plasma column and a temporal resolution to at least the time of character scale of compression of a z-pinch, which is as short as several nano second. In order to achieve this, a time-framing technique (e.g., microchannel plates (MCP)) is necessary. In the particular context of goals of investigations of z-p inch or laser plasma sources of radiation, there had to be spectral resolution of $\lambda/\Delta\lambda$ more than 500–700 for $\lambda \approx 1.0-2.0$ nm and more than 800–1500 for $\lambda < 0.3-0.6$ nm to discriminate between the resonance line and the intercombination and satellite lines of He- like ions in plasma, and there had to be a provision to monitor more than one line to obtain spatially resolved maps of $T_e$ and $N_e$ from line intensity ratios. It is very informative to measure these spectra of the ions of plasma in several spectral bands simultaneously, which correspond to different electron shells of ions (for example, K-shell in x-ray region and L-shell radiation of Ar z-pinch plasma ions).

The described diagnostic apparatus images more than one spatial dimension in more than one spectral band, overcoming two of the main limitations of current state-of-the-art imaging spectroscopy. The multi-band two-dimensional imaging spectrometer, that is described herein, is based on the application of a glass capillary converter (GCC). The GCC consists of a bundle of glass or quartz capillaries. EUV, soft x-ray, and x-ray radiation (spectral range 0.01 nm to 100 nm) are guided along the straight or slightly curved capillaries by multiple grazing-incidence reflections from the inner capillary surface. The GCC can concentrate, guide, and focus short wavelength radiation, and also filter hard x-ray radiation (by at least two orders of magnitude). The transmission of radiation along the quartz capillary has smooth spectral dependence upon wavelength, excluding the two downfalls at K-edges of Si ($\lambda=0.67$ nm) and of O ($\lambda=2.3$ nm). Previously, GCCs have been used in plasma diagnostics as hard x-ray filters in pinhole chambers, as a device to enhance the flux density of x-ray and EUV radiation on the entrance slit of a monochromator (by two orders of magnitude), and proposed as an x-ray streak camera element. Also GCC has been used in new types of polarimeters/spectrometers for EUV, SXR and x-ray radiation.

Table 1 presents the characteristics of existing x-ray and EUV imaging spectrometers together with the characteristics of the present invention.

TABLE 1

Characteristics of Short Wavelength Spectrometers

| Type | 1 | 2 | 3 | 4 | 5 | 6 | 7 |
|---|---|---|---|---|---|---|---|
| 1. flat crystal or MLM | 1–25 (25–200) | 0.1–0.2 | 100–1000 | 100 | 20* ≈100** | – | + |

TABLE 1-continued

Characteristics of Short Wavelength Spectrometers

| Type | 1 | 2 | 3 | 4 | 5 | 6 | 7 |
|---|---|---|---|---|---|---|---|
| 2. convex crystal or MLM | 1–25 (25–200) | 1 | 100–1000 | 100 | 20* ≈100** | + | + |
| 3. Johann scheme with crystal or MLM | 1–25 (25–200) | 0.05–0.2 | 1000–1000 | — | 20* ≈100** | – | + |
| 4. 2D spect-ph with crystal or MLM | 1–25 (25–200) | 0.05–0.2 | 1000 | 100 | 10–15* ≈100** | – | + |
| 5. microscope with crystal or MLM | 1–25 (50–200) | 0.01 | – | 1–10 | 1–10 | – | + |
| 6. New system with GCC | 1–200 | several regions | 500–1500 | 50–100** | 50–100** | + | + |

1. Spectral range (Å)
2. Relative spectral range $(\lambda_{max} - \lambda_{min})/2(\lambda_{max} + \lambda_{min})$.
3. Spectral resolution $\lambda/\Delta\lambda$.
4. Spatial resolution in direction of dispersion ($\mu$m).
5. Spatial resolution in transverse to dispersion ($\mu$m).
6. Possibility of temporal measurements of lines intensity inside whole spectral region of system during one shot of plasma device.
7. Possibility of temporal measurements of single lines intensity during one shot of plasma device.
*for small size source as laser plasma flame
**for long plasma column source as z-pinch

SUMMARY OF INVENTION

1. OBJECTS OF THE INVENTION

The present invention provides a spectrometer for observing short wavelength radiation emitted from a source. The spectrometer is capable of measuring a broad range of radiation simultaneously. The spectrometer may record the measurements for predetermined points of time or during specific intervals. The measurements may be presented in a two-dimensional image for analyzing the source of the radiation. The present invention is flexible in that it may be used to observe radiation from a variety of sources and various configurations may be used to achieve particular kinds of observations.

These and other objects and advantages of the present invention may be realized by reference to the remaining portions of the specification, claims, and abstract.

2. BRIEF DESCRIPTION OF THE INVENTION

The present invention comprises a spectrometer that is capable of measuring a wide band of radiation during predetermined points of time and generating two-dimensional images from the measurements. The spectrometer comprises a capillary array, a dispersive element, and an imaging system. The capillary array comprises a proximal end that is positioned to receive radiation from a source. Radiation that is received by the capillary array is transmitted to a distal end that is configured to emit the radiation in a predetermined pattern. As the radiation is emitted, it strikes the dispersive element. The dispersive element reflects the radiation in a predetermined pattern. For example, the radiation may be reflected so that a spectrum is created. The radiation then strikes the imaging system where sensors produce computer data signals.

The dispersive element may be formed in a large variety shapes. For example, the dispersive element may be planar, concave, or convex. In one embodiment of the present invention, the dispersive element is substantially concave. The distal end of the capillary array is positioned so that radiation emitted from the capillaries falls on different portions of the dispersive element. This allows separate sensors or different portions of the same sensor to receive radiation from the capillary array.

A pinhole plate may be placed between the radiation source and the proximal end to produce an optical image. Alternatively, and imaging mirror may be used to produce an optical image. In either embodiment, a filter may be placed between the source and the proximal end of the capillary array to remove unwanted radiation. This may be required in order to achieve a desired image.

The short wavelength imaging detector may be any of a number of systems that are well known in the art. For example, the wavelength imaging detector may comprise a multi-channel plate, a lens, a charge couple image sensor, and a computer.

Data from the sensors of the wavelength imaging detector is recorded by a computer in communication with the and collected, the data may be used to generate two-dimensional images of the source. The present invention includes a multi-band flat crystal spectrometer with an entrance pinhole imaging camera or short wavelength imaging mirror and a new EUV and x-ray wide band optical element, capillary array, to add an extra dimension to the spectrometer throughput. This new spectrometer uses a capillary array to multiplex a two-dimensional pinhole-camera image (or other x-ray imaging system, such as a curved crystal or a multi-layer mirror) of the z-pinch plasma column into one-dimensional output arrays. Each linear array is then spectrally dispersed by a crystal (for soft x-ray and x-ray regions) or multilayer mirror (MLM) for EUV and recorded by temporally gated imagery (for example, with microchannel plates (MCP) and charge capture device (CCD) units). Computers then reconstitute the plasma image.

Each element is used in multiple ways, to obtain for each plasma image point an array of time-resolved spectra, which covers the full plasma evolution. Spatial resolution of the spectrometer will achieve 50–100 $\mu$m. The spectral resolution ($\lambda/\lambda > 500-1500$) and spectral range of each channel will be sufficient for simultaneous measurement of several spectral characteristics of hot plasma. The sensitivity of the spectrometer will be adequate to record spatial and frame time resolved x-ray and EUV spectra in single shot Z-pinch or laser plasmas.

This invention can be used in the diagnostics of hot plasma, in x-ray and EUV astronomy, in atomic physics, surface analysis.

The above description sets forth, rather broadly, the more important features of the present invention so that the detailed description of the preferred embodiment which follows may be better understood and contributions of the present invention to the art may be better appreciated. There are, of course, additional features of the invention that will be described below and which will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Figure 1A:
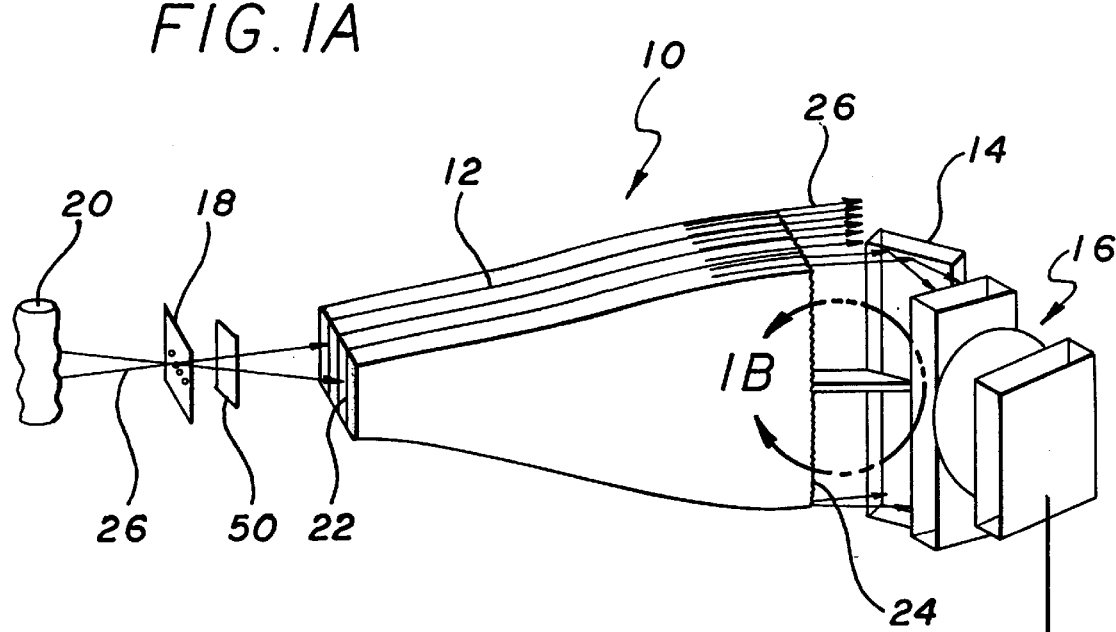
FIG. 1A is substantially an isometric schematic representation of one embodiment of the spectrometer of the present invention with a substantially planar dispersing element.

As seen in FIG. 1, the present invention comprises a spectrometer generally indicated by reference number 10. Spectrometer 10 comprises a glass capillary converter or capillary array 12, a dispersing element 14, and a short wavelength imaging detector 16. Spectrometer 12 is positioned to observe radiation emitted from source 20. Source 20 may be a plasma produced by a device such as a z-pinch device.

Capillary array 12 comprises a plurality of hollow glass or quartz capillaries. In the preferred embodiment, capillary array 12 comprises capillaries with inner and outer diameters 50 $\mu$m and 75–85 $\mu$m respectively and a length of 1000–1500 mm. The length of capillary array 12 is preferably 1000–1500 mm and it is preferably placed a minimum distance from the plasma of approximately 500 mm.

It is well known in the art that hollow glass or quartz capillaries with open ends may be used to guide or direct short wavelength radiation. For example, the device disclosed in U.S. Pat. No. 5,192,869 utilizes capillaries to direct and focus beams of radiation. In the preferred embodiment, the present invention comprises a plurality of linear arrays of capillaries. Each linear array comprises a plurality of individual capillaries that may be formed to have parallel axes. By combining a plurality of capillaries into a single array, the present invention is able to generate a two-dimensional images of the radiation emitted by source to 20 and it is able to measure different wavelengths of radiation simultaneously. Capillary array 12 may be formed in a number shapes to guide or direct radiation in different paths to achieve different results.

Figure 3:
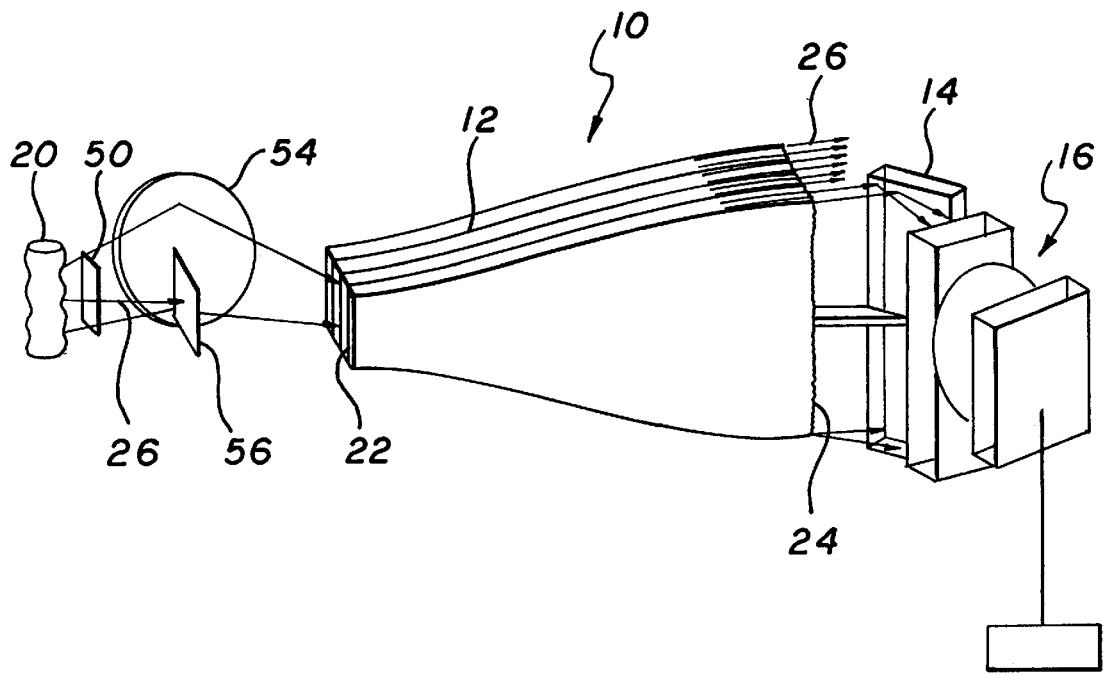
FIG. 3 is substantially an isometric schematic representation of another embodiment of the present invention with a short wavelength imaging mirror and a substantially planar dispersing element.
Figure 4:
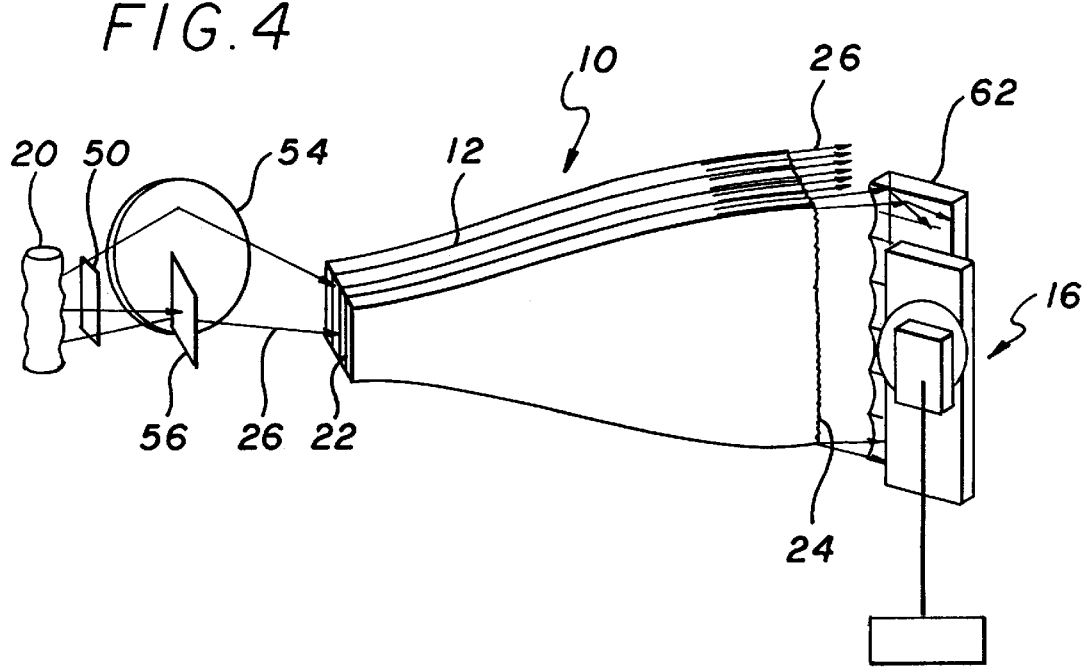
FIG. 4 is substantially an isometric schematic representation of another embodiment of the spectrometer of the present invention with a wavelength imaging detector and a substantially concave dispersing element.

Capillary array 12 comprises a proximal end 22 and a distal end 24. Proximal end 22 is positioned to receive radiation beams 26. The embodiment disclosed in FIG. 1 utilizes a pinhole plate 18 to create an image of radiation source 20. Pinhole plate 18 may be W or Mo foil with a pinhole having a diameter of ten to seventy $\mu$m. However, it is possible to use other devices to produce this optical image. For example, as seen in FIGS. 3 and 4, mirror 54 may be used to create an image. Mirror 54 may be any of a large variety of short wavelength mirrors that are well known art and may be configured in a variety of shapes and sizes. In this embodiment a shield 56 is provided for preventing radiation from directly entering proximal end 22.

In all of the embodiments, filter 50 may be provided in front of proximal end 22 of capillary array 12. Filter 50 may be used to prevent unwanted radiation from entering capillary array 12. Filter 50 to may be made of Be or mylar with an Al coating.

Once radiation enters proximal end 22 of capillary array 12, the radiation is conducted through the capillaries of capillary array 12 and exits the array at distal end 24. Radiation rays 26 exit distal end 24 and strike dispersing element 14. Dispersing element 14 is preferably formed from a multilayer mirror or a crystal, such as ADP, rock salt, or calcite, that is capable of reflecting the radiation at a particular angle of incidents. Multilayer mirrors are preferably used to observe EUV while crystals are preferably used to study SXR and regular x-rays. Dispersing element 14 is used to disperse radiation 26 into a desired pattern.

As radiation beams 26 are reflected off of dispersing element 14, they strike short wavelength imaging detector 16. Imaging detector 16 is capable of sensing the radiation and generating two-dimensional images of source 20.

Figure 1B:
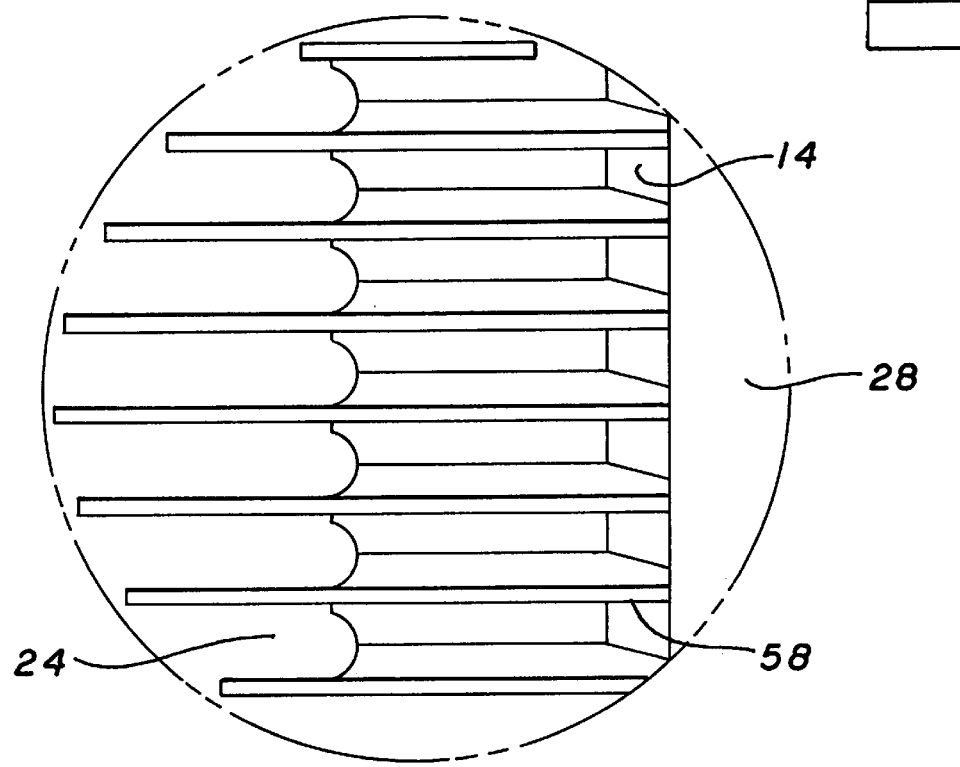
FIG. 1B is substantially an enlarged view of be insulators of the present invention seen in line 1B in FIG. 1A.

As seen in FIG. 1B, optical insulators 58 may be provided between the capillaries at the distal end of capillary array 12. Insulators 58 prevent light from different capillaries from interfering with each other. Insulators 58 may run from distal end 24 to dispersing element 14 and imaging system 16.

Figure 2A:
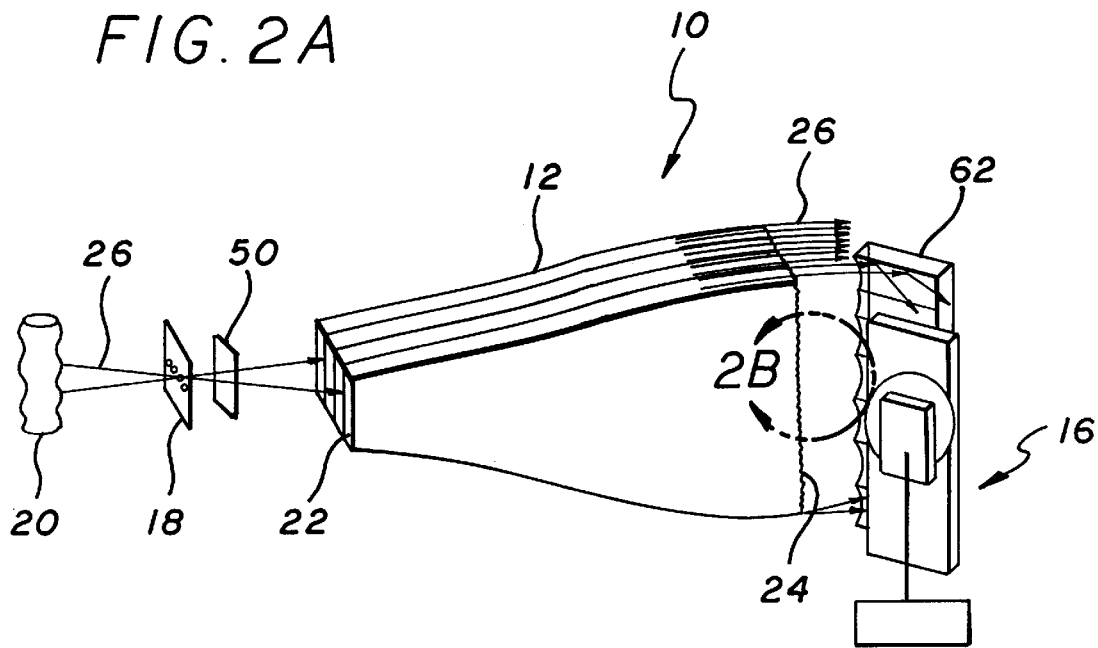
FIG. 2A is substantially an isometric schematic representation of another embodiment of the spectrometer of the present invention with a substantially concave dispersing element.
Figure 2B:
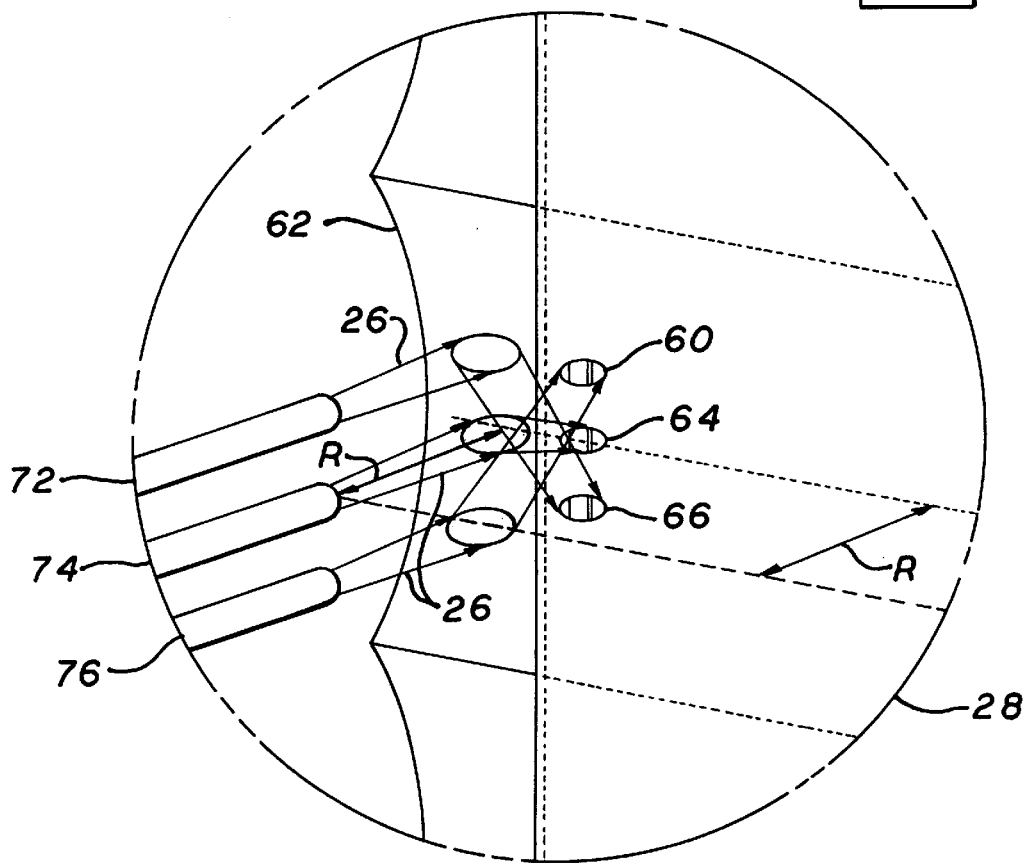
FIG. 2B is substantially an enlarged view of dispersing element of the present invention seen in line 2B in FIG. 2A.

In the embodiment disclosed in FIG. 1A and 1B, dispersing element 14 is substantially planar. This provides for a simple geometry that produces a particular type of dispersing pattern. However, dispersing element 14 may be shaped in many different configurations. For example, dispersing element 62 in FIG. 2A comprises a plurality of concave cylindrical surfaces. These concave services may be used to divide the light transmitted by capillary array 12 so that different wavelengths of radiation fall on different locations on the sensors in imaging system 16. As seen in FIG. 2B, the present invention may incorporate a Hamoshi-type x-ray spectrometer by allowing radiation from different capillaries to fall on different locations on imaging system 16. For example, a central capillary 74 may be placed a distance of one radius R away from the surface of dispersing element 62. Radius R is the radius of the curvature of the cylindrical surface of dispersing element 62. Radiation from the central capillary is reflected to a particular location 64 on multi-channel plate 28. Radiation from an upper capillary 72 falls on a location 66 and radiation from a lower capillary 76 falls on a location 60. Imaging system 16 may then combine signals receive from locations 60, 64, the and 66 to create a single image. In this embodiment, molded channel plate 28 is separated from dispersing over 62 by one radius R.

Figure 5:
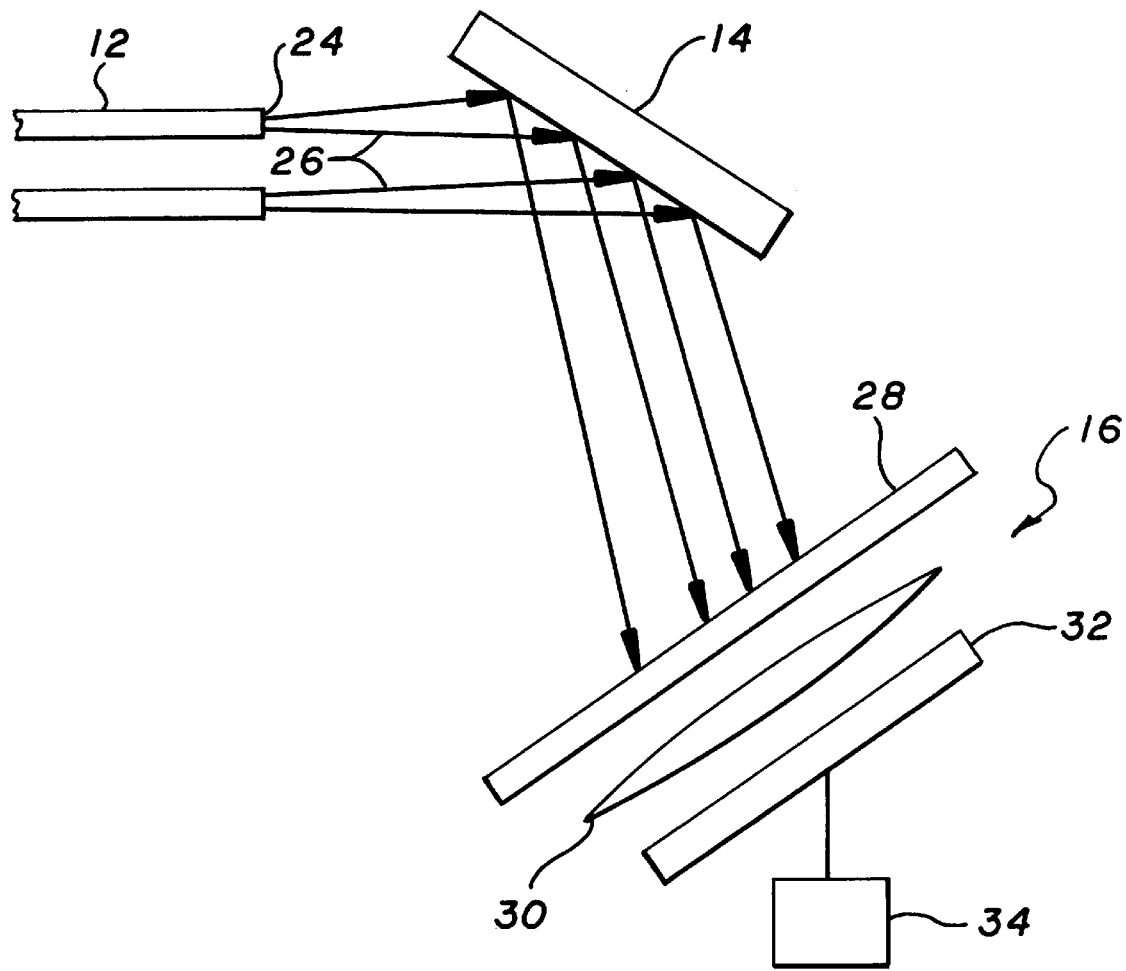
FIG. 5 is substantially a top schematic representation of the short wavelength imaging detector of the present invention.

As seen and FIG. 5, imaging system 16 comprises components that are well known in the art. Imaging system 16 comprises a multi-channel plate 28, a lens 30, charge-coupled imaging sensor 32 and a computer 34. As radiation is emitted from capillary array 12, beams 26 are reflected off of dispersing element 14 onto multi-channel plate 28. Multi-channel plate 28 amplifies the radiation and may convert the radiation to another wavelength of radiation. Multi-channel plate 28 may be controlled in a gated manner so that it produces output signals at predetermined points or intervals. This will allow imaging system 16 to record data only during particular times of interest.

Radiation produced by multi-channel plate 28 is transmitted to lens 30 where it is focused on charge-coupled device 32. Charge-coupled device 32 is in communication with computer 34. Computer 34 is adapted to record and process data signals produced by charge-coupled device 32. Software in computer 34 may be used to manipulate the data and produce graphical representations of the data such as two-dimensional images.

In the present invention, data produced by different portions of the sensors and imaging system 16 corresponds to different portions of source 20. In other words, one portion of source 20 corresponds to one capillary in capillary array 12 which corresponds to one portion of the sensors in imaging system 16. Signals produced by different portions of the sensor elements of imaging system 16 can be combined perform a complete image of source 20.

The calculated resolution of the spectrometer of the present invention and bands of spectral coverage for each channel will be adequate for simultaneous measurements of the spectral characteristics of plasma ions and K and L spectra in one pulse of a z-pinch device. The calculated sensitivity of this spectrometer will be enough for recording the spatial and frame time resolved x-ray and EUV spectra of a z-pinch set up with integral short wavelength yield above 5–10 J per pulse in spectral line, which is typical for most of existing powerful z-pinch facilities.

SUMMARY

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A spectrometer for observing radiation emitted by a source, the spectrometer comprising the following:
   (A) at least one capillary array having a proximal and a distal end, said proximal end being positioned to receive radiation from the source, said distal end being positioned to emit radiation in a predetermined path;
   (B) at least one dispersive element positioned to receive radiation emitted from said distal end of said capillary array; and
   (C) at least one short wavelength imaging detector positioned to receive radiation reflected from said dispersive element.

2. The spectrometer of claim 1 wherein said short wavelength imaging detector comprises at least one radiation sensor.

3. The spectrometer of claim 1 wherein said short wavelength imaging detector comprises at least one computer.

4. The spectrometer of claim 1 wherein said short wavelength imaging detector is adapted to generate spectral images from radiation emitted by the source for predetermined time periods.

5. The spectrometer of claim 1 wherein said short wavelength imaging detector is adapted to generate a two-dimensional image from radiation emitted by the source.

6. The spectrometer of claim 1 wherein said dispersive element comprises a multi-layer mirror.

7. The spectrometer of claim 1 wherein said dispersive element comprises crystals.

8. The spectrometer of claim 1 wherein said dispersive element comprises a reflective surface, wherein said reflective surface comprises a substantially planar surface.

9. The spectrometer of claim 1 wherein said dispersive element comprises a reflective surface, wherein said reflective surface comprises a substantially concave surface.

10. The spectrometer of claim 1 wherein said dispersive element comprises a reflective surface, wherein said reflective surface comprises a substantially convex surface.

11. The spectrometer of claim 1 wherein said capillary array comprises a plurality of linear capillary arrays.

12. The spectrometer of claim 1 further comprising at least one insulator spanning from said distal end to said dispersive element and said short wavelength imaging detector.

13. The spectrometer of claim 1 further comprising a pinhole plate positioned between said proximal end of said capillary array and said source.

14. The spectrometer of claim 1 further comprising a short wavelength imaging mirror positioned between said proximal and of said capillary array and said source.

15. The spectrometer of claim 14 further comprising a shield positioned between the source and said proximal end.

16. A spectrometer for observing radiation emitted by a source, the spectrometer comprising the following:
   (A) capillary conducting means positioned to receive the radiation from the source for changing a path of the radiation as it is emitted from the source to a predetermined path;
   (B) dispersing means positioned to receive radiation from said conducting means for dispersing radiation emitted from said conducting means in a predetermined pattern;
   (C) imaging means positioned to receive radiation from said dispersing means for sensing radiation dispersed by said dispersing means.

17. The spectrometer of claim 16 wherein said conducting means emits rays of radiation, further comprising insulators means for preventing interference of said rays of radiation.

18. The spectrometer of claim 16 further comprising pinhole means positioned between said conducting means and the source for producing an image.

19. A method of observing radiation emitted from a source, the method comprising the following steps:
   (A) changing a path of the radiation as it is emitted from the source to a predetermined path using a capillary array;

(B) dispersing the radiation in the predetermined path into a predetermined pattern; and (C) sensing the dispersed radiation.

20. The method of claim 19 wherein the step of dispersing the radiation is performed by a dispersing element having a substantially planar reflective surface.

21. The method of claim 19 wherein the step of dispersing the radiation is performed by a dispersing element having a substantially concave reflective surface.

22. The method of claim 19 wherein the step of dispersing the radiation is performed by a dispersing element comprising a multilayer mirror.

23. The method of claim 19 wherein the step of dispersing the radiation is performed by a dispersing element comprising a crystal.

24. The method of claim 19 further comprising the step of generating a two dimensional image of the radiation.

* * * * *